US006504951B1

(12) United States Patent
Luo et al.

(10) Patent No.: US 6,504,951 B1
(45) Date of Patent: Jan. 7, 2003

(54) METHOD FOR DETECTING SKY IN IMAGES

(75) Inventors: Jiebo Luo, Rochester, NY (US); Stephen Etz, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/450,190

(22) Filed: Nov. 29, 1999

(51) Int. Cl.[7] .................................................. G06K 9/00
(52) U.S. Cl. ........................................................ 382/165
(58) Field of Search ................................ 382/162–167, 382/305, 224–228; 358/515–527; 345/597–618

(56) References Cited

U.S. PATENT DOCUMENTS

| | | | | |
|---|---|---|---|---|
| 5,642,443 A | | 6/1997 | Goodwin et al. | 382/289 |
| 5,822,453 A | * | 10/1998 | Lee et al. | 382/169 |
| 5,889,578 A | | 3/1999 | Jamzadeh | 355/41 |
| 5,901,245 A | | 5/1999 | Warnick et al. | 382/169 |
| 6,097,470 A | * | 8/2000 | Buhr et al. | 355/38 |
| 6,282,317 B1 | * | 8/2000 | Luo et al. | 382/203 |
| 6,408,103 B1 | * | 6/2002 | Gallagher et al. | 382/260 |

FOREIGN PATENT DOCUMENTS

EP          0 707 283 A2       4/1996       .............. G06T/7/00

OTHER PUBLICATIONS

Azami et al. "Route guidance sign identification using 2–D structural description" Proc. of the 1996 IEEE Intelligent Vehicles Sysposium, 1996, pp. 153–158, Sep. 1996.*

"Neural Network Toolbox for Use with MATLAB" by Howard Demuth and Mark Beale. The MathWorks, Inc., 1998.
"The Nature of Light & Colour in the Open Air" by M. Minnaert. Dover Publications, Inc., 1954.
"Towards Physics–based Segmentation of Photographic Color Images" by Jiebo Luo, Robert T. Gray, Hsien–Che Lee. Proc. IEEE Int. Conf. Image Process., 997.
"On Image Classification: City vs. Landscape" by Aditya Vailaya, Anil Jain, and Hong Jiang Zhang, 1998.
"Decoding Image Semantics Using Composite Region Templates" by John R. Smith and Chung–Sheng Li. Proc. IEEE Intl. workshop on Content–based Access of Image and Video Database, 1998.
"Indoor–Outdoor Image Classification" by Martin Szummer and Rosalind W. Picard. Proc. IEEE Intl. Workshop on Content–based Access of Image and Video Database, 1998.
"Automatic Image Annotation Using Adaptive Color Classification" by Eli Saber, A. Murat Tekalp, Reiner Eschbach and Keith Knox. Graphical Models and Image Processing, vol. 58, No. 2, Mar. pp. 115–126, 1996.

* cited by examiner

Primary Examiner—Jingge Wu
(74) Attorney, Agent, or Firm—David M. Woods

(57) ABSTRACT

A method, image recognition system, computer program, etc., for detecting sky regions in an image comprise classifying potential sky pixels in the image by color, extracting connected components of the potential sky pixels, eliminating ones of the connected components that have a texture above a predetermined texture threshold, computing desaturation gradients of the connected components, and comparing the desaturation gradients of the connected components with a predetermined desaturation gradient for sky to identify true sky regions in the image.

30 Claims, 13 Drawing Sheets

METHOD FOR DETECTING SKY IN IMAGES

CROSS-REFERENCE TO RELATED APPLICATION(S)

Reference is made to commonly assigned copending application Ser. No. 09/450,366, entitled "Determining Orientation of Images Containing Blue Sky" and filed in the name of Jiebo Luo, which is assigned to the assignee of this application.

FIELD OF THE INVENTION

The invention relates generally to the field of digital image processing and digital image understanding, and more particular to a system for detecting which regions in photographic and other similar images are of the sky and more particularly to a sky detection system based on color classification, region extraction, and physics-motivated sky signature validation.

BACKGROUND OF THE INVENTION

Sky is among the most important subject matters frequently seen in photographic images. Detection of sky can often facilitate a variety of image understanding, enhancement, and manipulation tasks. Sky is a strong indicator of an outdoor image for scene categorization (e.g., outdoor scenes vs. indoor scenes, picnic scenes vs. meeting scenes, city vs. landscape, etc.). See, for example M. Szummer and R. W. Picard, "Indoor-Outdoor Image Classification," in *Proc. IEEE Intl. Workshop on Content-based Access of Image and Video Database*, 1998 and A. Vailaya, A. Jain, and H. J. Zhang, "On Image Classification: City vs. Landscape," in *Proc. IEEE Intl. Workshop on Content-based Access of Image and Video Database*, 1998 (both of which are incorporated herein by reference). With information about the sky, it is possible to formulate queries such as "outdoor images that contain significant sky" or "sunset images" etc. (e.g., see J. R. Smith and C.-S. Li, "Decoding Image Semantics Using Composite Region Templates," in *Proc. IEEE Intl. Workshop on Content-based Access of Image and Video Database*, 1998, incorporated herein by reference). Thus, sky detection can also lead to more effective content-based image retrieval.

For recognizing the orientation of an image, knowledge of sky and its orientation may indicate the image orientation for outdoor images (contrary to the common belief, a sky region is not always at the top of an image). Further, in detecting main subjects in the image, sky regions can usually be excluded because they are likely to be part of the background.

The most prominent characteristic of sky is its color, which is usually light blue when the sky is clear. Such a characteristic has been used to detect sky in images. For example, U.S. Pat. No. 5,889,578, entitled "Method and Apparatus for Using Film Scanning Information to Determine the Type and Category of an Image" by F. S. Jamzadeh, (which is incorporated herein by reference) mentions the use of color cue ("light blue") to detect sky without providing further description.

U.S. Pat. No. 5,642,443, entitled, "Whole Order Orientation Method and Apparatus" by Robert M. Goodwin, (which is incorporated herein by reference) uses color and (lack of) texture to indicate pixels associated with sky in the image. In particular, partitioning by chromaticity domain into sectors is utilized by Goodwin. Pixels with sampling zones along the two long sides of a non-oriented image are examined. If an asymmetric distribution of sky colors is found, the orientation of the image is estimated. The orientation of a whole order of photos is determined based on estimates for individual images in the order. For the whole order orientation method in Goodwin to be successful, a sufficiently large group of characteristics (so that one with at least an 80% success rate is found in nearly every image), or a smaller group of characteristics (with greater than a 90% success rate -which characteristics can be found in about 40% of all images) is needed. Therefore, with Goodwin, a very robust sky detection method is not required.

In a work by Saber et al. (E. Saber, A. M. Tekalp, R. Eschbach, and K. Knox, "Automatic Image Annotation Using Adaptive Color Classification", CVGIP: *Graphical Models and Image Processing*, vol. 58, pp. 115–126, 1996, incorporated herein by reference), color classification was used to detect sky. The sky pixels are assumed to follow a 2D Gaussian probability density function (PDF). Therefore, a metric similar to the Mahalonobis distance is used, along with an adaptively determined threshold for a given image, to determine sky pixels. Finally, information regarding the presence of sky, grass, and skin, which are extracted from the image based solely on the above-mentioned color classification, are used to determine the categorization and annotation of an image (e.g., "outdoor", "people").

Recognizing that matching natural images solely based on global similarities can only take things so far. Therefore, Smith, supra, developed a method for decoding image semantics using composite regions templates (CRT) in the context of content-based image retrieval. With the process in Smith, after an image is partitioned using color region segmentation, vertical and horizontal scans are performed on a typical 5×5 grid to create the CRT, which is essentially a 5×5 matrix showing the spatial relationship among regions. Assuming known image orientation, a blue extended patch at the top of an image is likely to represent clear sky, and the regions corresponding to skies and clouds are likely to be above the regions corresponding to grass and trees. Although these assumptions are not always valid, nevertheless it was shown in Smith, supra, that queries performed using CRTs, color histograms and texture were much more effective for such categories as "sunsets" and "nature".

PROBLEMS TO BE SOLVED BY THE INVENTION

The major drawback of conventional techniques is that they cannot differentiate other similarly colored or textured subject matters, such as a blue wall, a body of water, a blue shirt, and so on. Furthermore, some of these techniques have to rely on the knowledge of the image orientation. Failure to reliably detect the presence of sky, in particular false positive detection, may lead to failures in the downstream applications.

SUMMARY OF THE INVENTION

The invention provides a robust sky detection system which is based on color hue classification, texture analysis, and physics-motivated sky trace analysis. The invention utilizes hue color information to select bright, sky colored pixels and utilizes connected component analysis to find potential sky regions. The invention also utilizes gradient to confirm that sky regions are low in texture content and segments open space, defined as smooth expanses, to break up adjacent regions with similar sky color beliefs but dissimilar sky colors. The invention also utilizes gradient to determine the zenith-horizon direction and uses a physics-motivated sky trace signature to determine if a candidate region fits a sky model.

More specifically, the invention can take the form of a method, image recognition system, computer program, etc., for detecting sky regions in an image and comprises classifying potential sky pixels in the image by color, extracting connected components of the potential sky pixels, eliminating ones of the connected components that have a texture above a predetermined texture threshold, computing desaturation gradients of the connected components, and comparing the desaturation gradients of the connected components with a predetermined desaturation gradient for sky to identify true sky regions in the image.

The desaturation gradients comprise desaturation gradients for red, green and blue trace components of the image and the predetermined desaturation gradient for sky comprises, from horizon to zenith, a decrease in red and green light trace components and a substantially constant blue light trace component.

The color classifying includes forming a belief map of pixels in the image using a pixel classifier, computing an adaptive threshold of sky color, and classifying ones of the pixels that exceed the threshold comprises identifying a first valley in a belief histogram derived from the belief map. The belief map and the belief histogram are unique to the image.

The invention also determines a horizontal direction of a scene within the image by identifying a first gradient parallel to a width direction of the image, identifying a second gradient perpendicular to the width direction of the image and comparing the first gradient and the second gradient. The horizontal direction of the scene is identified by the smaller of the first gradient and the second gradient.

ADVANTAGES OF THE INVENTION

One advantage of the invention lies in the utilization of a physical model of the sky based on the scattering of light by small particles in the air. By using a physical model (as opposed to a color or texture model), the invention is not likely to be fooled by other similarly colored subject matters such as bodies of water, walls, toys, and clothing. Further, the inventive region extraction process automatically determines an appropriate threshold for the sky color belief map. By utilizing the physical model in combination with color and texture filters, the invention produces results which are superior to conventional systems.

The invention works very well on 8-bit images from sources including film and digital cameras after pre-balancing and proper dynamic range adjustment. The sky regions detected by the invention show excellent spatial alignment with perceived sky boundaries.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

As shown above, a robust sky detection process needs to go beyond color and texture. Specifically, a physical model of the sky is desirable, if possible, to differentiate true sky regions from other similarly colored and textured subject matters. The invention described below provides a robust sky detection process that differentiates true sky regions from other similarly colored and textured subject matters.

In this application, sky detection comprises identifying all the pixels in an image that correspond to the unoccluded part of the sky. Furthermore, sky detection assigns each individual segmented regions a probability that it contains sky. It is left to the subsequent conventional processing of the image understanding system to either utilize the probability representation or convert it into a crisp decision. Some important features of the invention include a robust sky detection process based on color hue classification, texture analysis, and physics-motivated sky trace analysis; utilization of color hue information to select bright, sky colored pixels; utilization of connected component analysis to find potential sky regions; utilization of gradient to confirm that sky regions are low in texture content (i.e., open space); utilization of open space segmentation to break up adjacent regions with similar sky color beliefs and dissimilar sky colors; utilization of gradient to determine the zenith-horizon direction; and utilization of a physics-motivated sky trace signature to determine if a candidate region fits a sky model.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Figure 1:
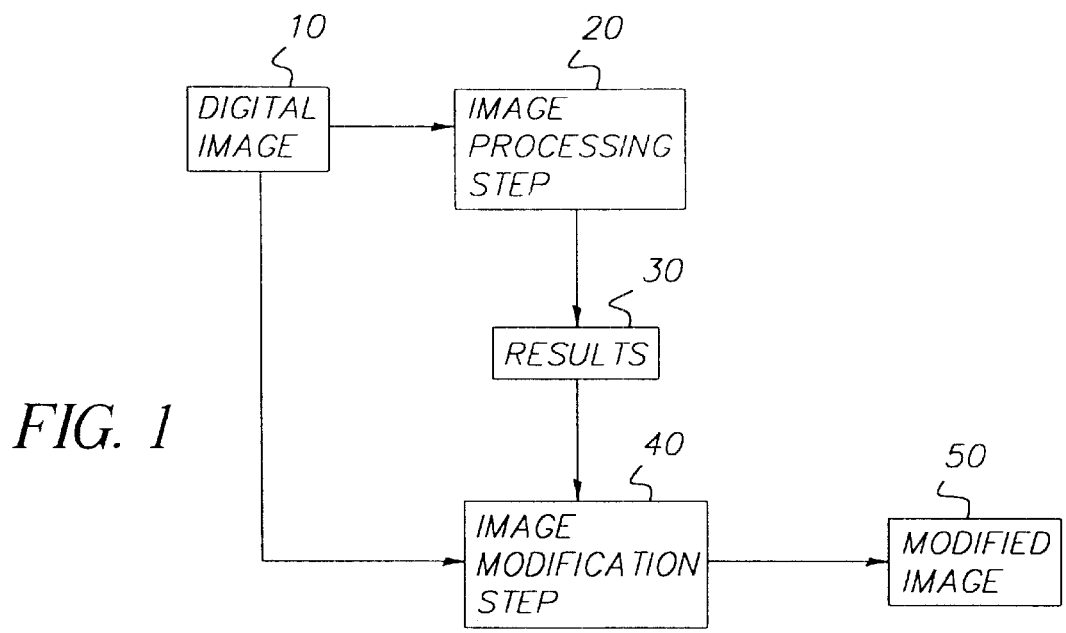
FIG. 1 is a schematic architectural diagram of one embodiment of the invention.

A block diagram of the overall sky detection system (e.g., the digital image understanding technology) is shown in FIG. 1. First, a digital image 10 is digitally processed 20. The results 30 obtained from processing step 20 are used along with the original digital image 10 in an image modification step 40 to produce a modified image 50.

Figure 2:
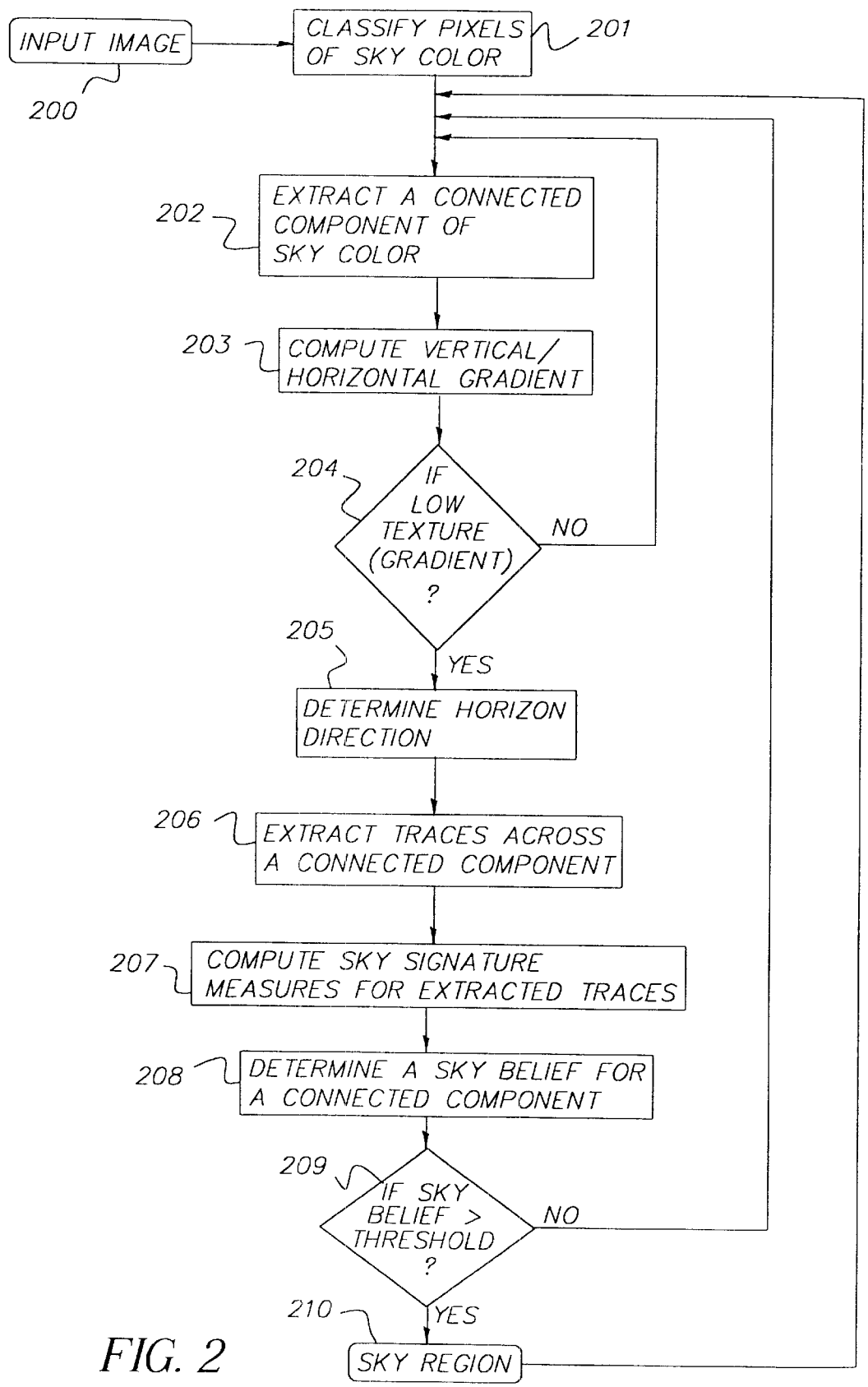
FIG. 2 is a schematic architectural diagram of one embodiment of the invention.

A more specific block diagram of the inventive sky detection process is shown in FIG. 2. The inventive method comprises three main stages. In the first main stage (e.g., item 201), color classification is performed by a multi-layer back-propagation neural network trained in a bootstrapping fashion using positive and negative examples, that is discussed in detail below. The output of the color classification is a map of continuous "belief" values, which is preferable over a binary decision map.

In the next main stage, a region extraction process (e.g., item 202) automatically determines an appropriate threshold for the sky color belief map by finding the first valley point encountered moving from lower beliefs to high beliefs in the belief histogram, and performs a connected component analysis. In addition, open space detection (e.g., item 204) is incorporated to (1) rule out highly textured regions and (2) separate sky from other blue-colored regions such as bodies of water. Taking the intersection between pixels with suprathreshold belief values, and the connected components in the open-space map creates seed regions. For pixels with sub-threshold belief values, the continuity in belief values as well as continuity in color values guide region growing from the seed regions.

Finally, in the third main stage, the sky signature validation process (e.g., items 205–209) estimates the orientation of sky by examining vertical/horizontal gradients for each extracted region, extracting 1D traces within the region along the estimated horizon-to-zenith direction, determining (by a set of rules discussed below) whether a trace resembles a trace from the sky, and finally computing the sky belief of the region based on the percentage of traces that fit the physics-based sky trace model. In one embodiment, the invention identifies the horizontal direction of a scene within the image by identifying a first gradient parallel to a width direction of the image and a second gradient perpendicular to the width direction of said image, where the smaller of the first gradient and the second gradient indicate the horizontal direction of the scene.

More specifically, in FIG. 2, an input image is received in digital form 200. The pixels are then classified into sky-colored and non sky-colored pixels 201, using the inventive color classification process, as discussed below. Using the connected component analysis also discussed below, a spatially contiguous region of sky-colored pixels is extracted 202. Gradient operators are overlaid on every interior pixel of the connected component (or "region") to compute horizontal and vertical gradient values 203. The pixels near the boundary of the connected component are preferably excluded in one embodiment because they often represent the large-magnitude transition between the sky and other subject matters, for example, at the horizon.

The average horizontal and vertical gradient values, Gx and Gy, are computed using all the interior pixels of the region. A number of tests will disqualify a candidate region based on excessive texture. Thus, if either gradient value is above a pre-determined high threshold $T_{high}$, indicating that the region is highly textured, the region is not considered a sky region. If $|G_x|$ and $|G_y|$ are almost identical, the region is also not considered a sky region. Furthermore, if the color (hue) distribution of all the pixels in the candidate region does not fit the expected characteristic of a sky region, the region is also not considered a sky region.

The invention recognizes that, the 3D shape of the sky color distribution should resemble a tilted ellipsoid with its long axis approximately along the luminance direction, which is partially a result of the desaturation effect, as discussed in detail below.

If the region passes the low texture test 204, the possible direction of zenith to horizon orientation is determined 205. If not, processing returns to item 202 to analyze the next potential region of pixels that has sky color. In particular, the gradient in the red channel is examined. If $|Gx|>|Gy|$, there is an indication of a landscape image. Otherwise, the image is most likely a portrait image. Furthermore, for a landscape image, if Gx<0, there is an indication of an upright image, otherwise it is most likely an upside-down image. For a portrait image, if Gy<0, there is an indication of a leftside-up image, otherwise it is most likely a rightside-up image.

Traces are then extracted across a candidate sky region along the horizon-zenith direction 206. For each trace, a plurality of sky-trace signatures 207 are measured to determine whether each trace likely comes from a sky region. The likelihood 208, or belief that a candidate region is sky, is determined by the voting from all the extracted sky traces. If the overall belief of a candidate region is above a pre-determined threshold 209, the candidate region is declared a sky region 210. Processing then returns to analyze all candidate regions in the same fashion (e.g., processing returns to item 202). In the case where detected sky regions disagree on the sky orientation, the overall orientation of the image is decided by the results from larger, higher belief sky regions. Regions with conflicting sky orientations are rejected.

It is almost axiomatic that, to the human visual system, the sky is blue, grass is green, dirt is gray/red/brown, and water is blue/green. However, what is actually recorded in a digital image is somewhat different. This is true not only for sky regions that contain warm colors associated with sunrise and sunset, but also for sky regions that appear more blue than their color records indicate. To confound even more the problem, color balance of the whole image can be off due to the error introduced during image capture and in other stages of the imaging chain.

The blue appearance of the sky in a color image is the results of human physiology and psychology, as well as physics—the red and green component at a blue-appearing sky pixel can be more intense (by a small percentage) than the blue component. In addition, clear, unclouded sky is usually the brightest subject matter in an image, although the sun itself, illuminated clouds, snow, ice or some man-made objects can be brightened than the blue sky. The sun radiates most brightly in the orange-yellow wavelength. The wavelength selective scattering of air particles disperses the blue light component of the sun ray's much more strongly than the longer wavelength according to Rayleigh's law, which states that scattering is inversely proportional to the fourth power of the wavelength (e.g., see C. F. Bohren and D. R. Huffman, *Absorption and Scattering of Light by Small Particles*, New York, John Wiley and Sons, 1983, incorporated herein by reference). The color of the sky is, indeed, largely composed of violet (to which our eyes are not very sensitive) and further a fair amount of blue, a little green and very little yellow and red—the sum of all these components is sky-blue (e.g., see M. Minnaert, *The Nature of Light and Color in the Open Air.* New York: 1954, incorporated herein by reference).

However, the blue appearance of the sky is not uniform. Sky often appears desaturated toward the horizon. When one looks at the clear sky directly overhead with the sun off to the side, the scattered blue light dominates and the sky appears as deep blue. As one shifts the gaze towards a distant horizon, the various selective factors tend to equalize and the sky appears desaturated to almost white.

There are a number of interesting effects regarding the distribution of light in the sky, e.g., halos, mirages, and rainbows. Among them, the light intensity increases from the zenith to the horizon while at the same time the color changes from deep blue to white. This effect arises primarily from the great thickness of the layer of air between our eyes and the horizon. Although the small particles of the air scatter the blue rays by preference, the scattered rays are weakened most in their long path from the scattering particles to our eyes. Because of a very thick stratum of air, the scattering and attenuation effects counteract each other.

Suppose a small particle at a distance s from a given spot scatters the fraction sds (where s is the color-dependent scattering factor and ds is the size of the particle). The amount of light is weakened in the ratio $e^{-sx}$ before reaching that given spot. The light received from an infinitely thick layer of air (a reasonable approximation) would consist of the sum of contributions from all the particles ds, that is, $$\int_0^\infty se^{-sx}dx,$$

which is equal to one. Evidently, the amount of received light is then independent of s, and thus the color of the light.

Therefore, the sky close to the horizon shows the same brightness and color as a white screen illuminated by the sun. Moreover, the layers of air close to the ground may contain more floating large particles of dust, which scatter light of all colors equally intensely and make the color of the light whiter (even when the layer of air cannot be considered to be of infinite thickness).

If the observer is facing away from the sun, when the sunshines behind the observer of laterally, the concentric distribution of the light can be approximately parallel to the horizon because of the position of the sun (high above the horizon) as well as the observer's limited view. If the observer looks in the direction of the sun (one should stand in the shadow of a building near the edge of the shadow), the brightness of the sky increases rapidly close to the sun and even becomes dazzling, its color becoming more and more white. In photographic images, it is extremely unlikely that one would take a picture of the direct sun light, except at sunrise or sunset, when the sun is on the horizon and the intensity of the light is much weaker.

Figure 3A:
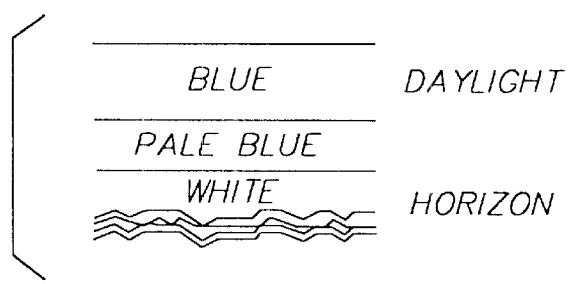
FIGS. 3A–3B are schematic diagrams illustrating the colors of daylight and twilight, respectively, in a clear sky.
Figure 3B:
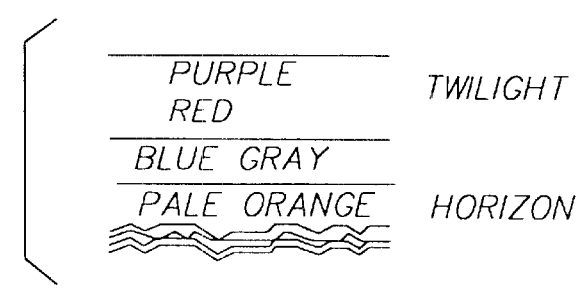

While the blue sky can be considered as the finest example of a uniform gradation of color, twilight's exhibit much more dramatic color gradation in a similar form of concentric distribution of constant brightness and color, as illustrated in FIGS. 3A–B. More specifically, FIGS. 3A–B illustrate the different colors, which are seen at the eastern horizon as the sun sets (e.g., daylight vs. twilight) in the western horizon. Although it is not the focus of this invention to detect twilight sky, these unique signatures of the twilight sky can be exploited in a more general sky detection process. In fact, when one of the features used in the invention was turned off, the process successfully detected the twilight sky in FIG. 3B, as discussed below.

It is also important to look at the factors determining the color of the water, which is often indistinguishable from that of the sky. Part of the light our eye receives from water is reflected by the surface; it acts like a mirror when it is smooth, and the color of the water is blue, gray according to the color of the sky. The color of the sea (or any large open body of water) in the distance is about the same as that of the sky at the height of 20° to 30°, and darker than the sky immediately above the horizon. This is because only part of the light is reflected when our gaze falls on the slopes of distant wavelets (e.g., see Minnaert, supra).

Apart from reflection, deep water has a "color of its own"—the color of the light scattered back from below. The depth of the deep water and similar deep water can be considered so great that practically no light returns form the bottom of it. The "color of its own" is to be attributed to the combined effects of scattering and absorption in the water. The color of deep, almost pure water is blue due to the absorption by the water in the orange and red parts of the spectrum, after the light penetrates the water and is scattered back again.

For the purpose of sky detection, one important issue is to differentiate bodies of blue (usually deep) water, whether they co-appear with the sky or not, from the sky. The factors of great concern are the absorption of orange and red components of the light by the water. The waves and undulations of such deep water bodies create small surfaces of various slopes. In general, the color is darker when our gaze falls on a surface more perpendicular to the gaze or closer to us. However, the changes are primarily in brightness instead of hue.

Turning now to color classification, mentioned briefly above (e.g., item 201 in FIG. 2), the invention first trains a color classifier specifically for clear, light-blue sky seen at daytime for simplicity and clarity. Sky regions which contain the warm colors associated with sunrise and sunset are not be lumped in with the blue-sky and gray-sky regions that form the background in many outdoor scenes. In the context of the invention, the color-based detection identifies all candidate blue sky pixels, which are then screen as regions for spatial signatures consistent with clear sky.

Neutral network training is then utilized to complete the training of the color classifier. The initial training set includes images having ideal blue sky characteristics, gray sky images, and non-sky (primarily indoor) images. All blue sky pixels were included as positive examples, and negative examples were included by sampling from among all pixels that are neither blue sky nor water.

A feedforward neural network was constructed with two hidden layers, containing 3 or 2 neurons, and a single output neuron (e.g., see Howard Demuth and Mark Beale, *Matlab Neural Network Toolbox,* The Math Works, Inc., 1998). The hidden layer neurons had tangent-sigmoidal transfer functions, while the output neuron's transfer function was log-sigmoidal. The network was trained using Levenberg-Marquardt backpropagation to classify pixel values as ideal blue sky or non-sky (e.g., see Howard Demuth and Mark Beale). The target responses are a=1 for ideal blue sky pixels and a=0 for non-sky.

The color classifier, so trained, outputs a belief value between 0 and 1 for each pixel processed, 1 indicating a pixel highly likely to be blue sky and 0 indicating a pixel not very likely to be blue sky. To help visualize the invention's response to points in the (r,g,b) input space, a regularly-spaced grid of (r,g,b) triplets from example images processed with the invention is shown in FIG. 4A, with each color plane shown separately in FIGS. 4A–4D.

Figure 4A:
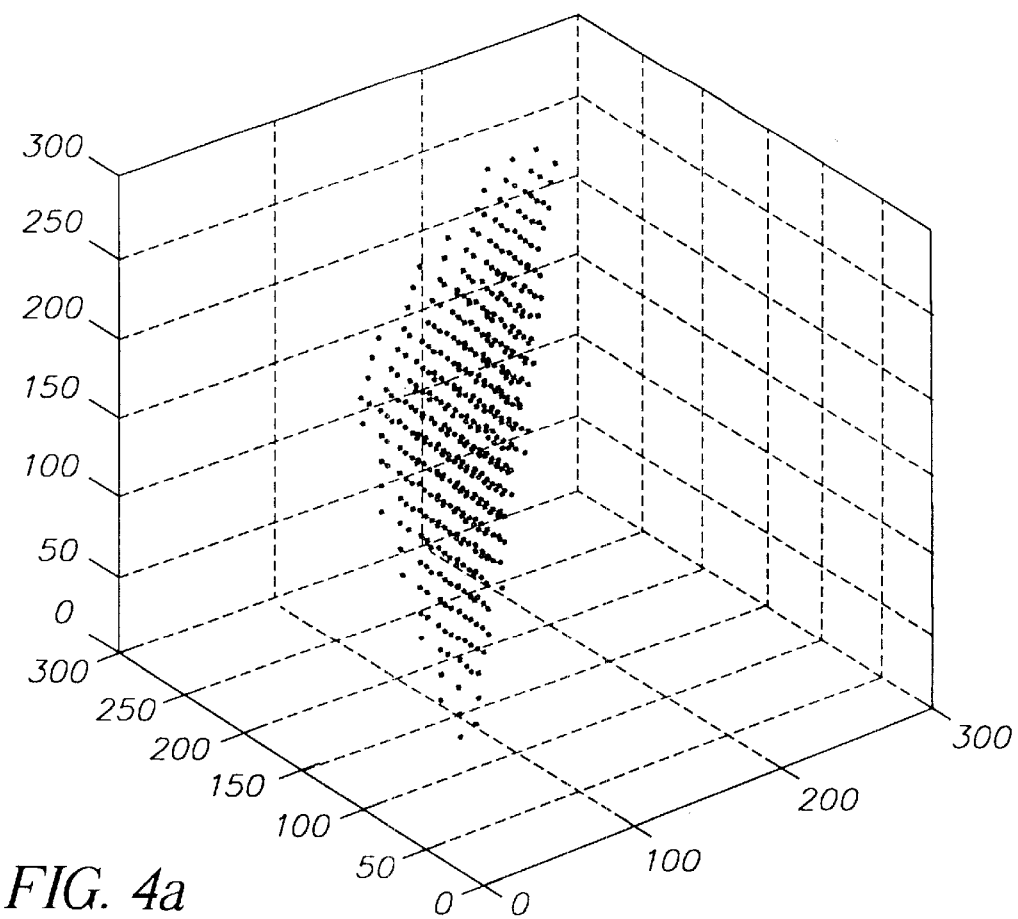
FIGS. 4A–4D show is a three-dimensional graphical illustration of the cluster of blue sky in color space and the respective color planes that produce the cluster and the respective color planes thar produce the cluster.
Figure 4B:
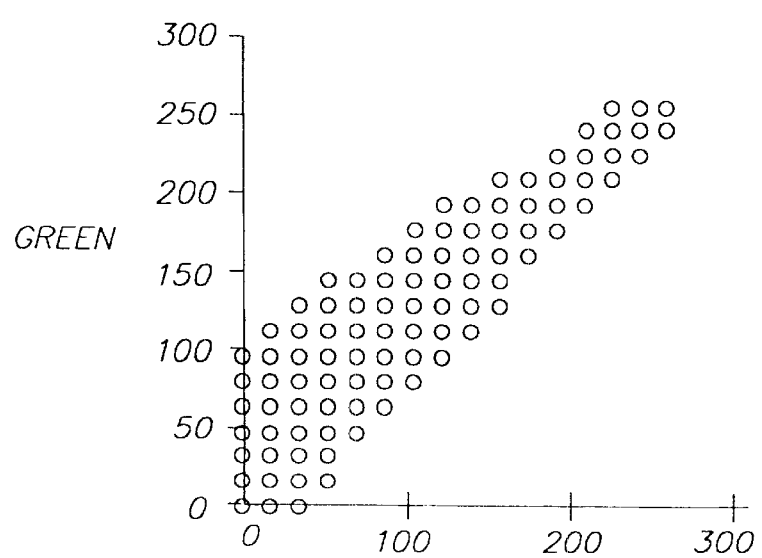
Figure 4C:
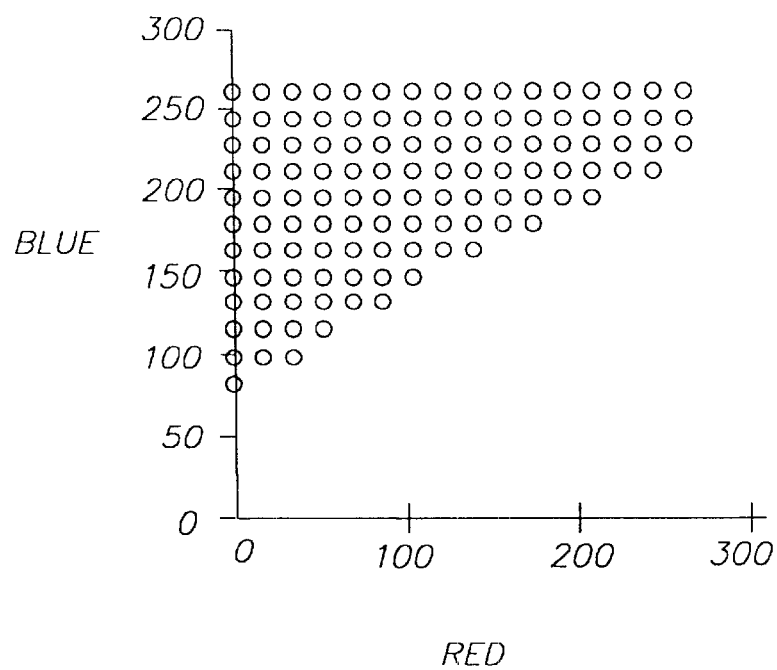
Figure 4D:
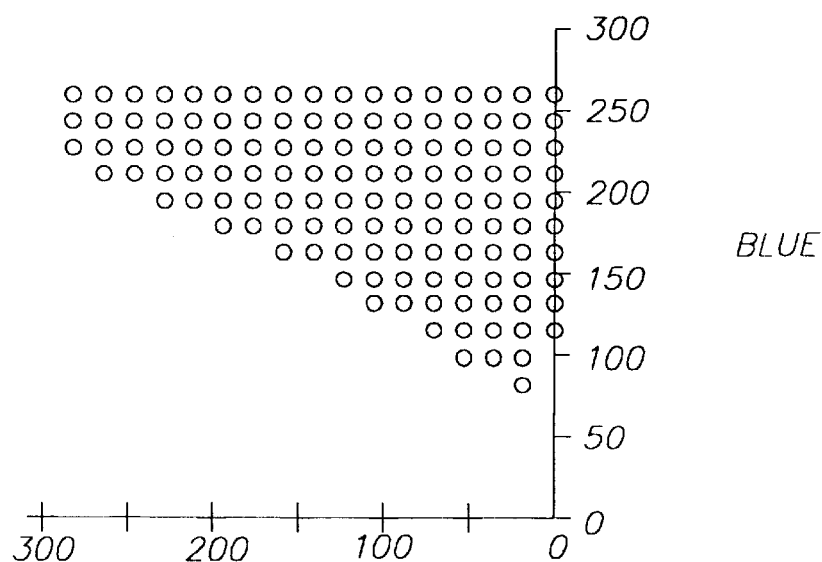

Points producing a blue-sky belief great that 0.1 are marked by "." in FIG. 4A. The projections of this distribution onto the three planes are also shown (marked by "o"). Note that the distribution is highly elongated along the direction of luminance, and starts to diverge a bit towards lower luminance. For a specific input image, each pixel is classified independently, and a belief map is created by setting the brightness of each pixel proportional to its belief value. Examples of such belief maps are shown in FIGS. 12E–F and 13E–F.

Figure 5:
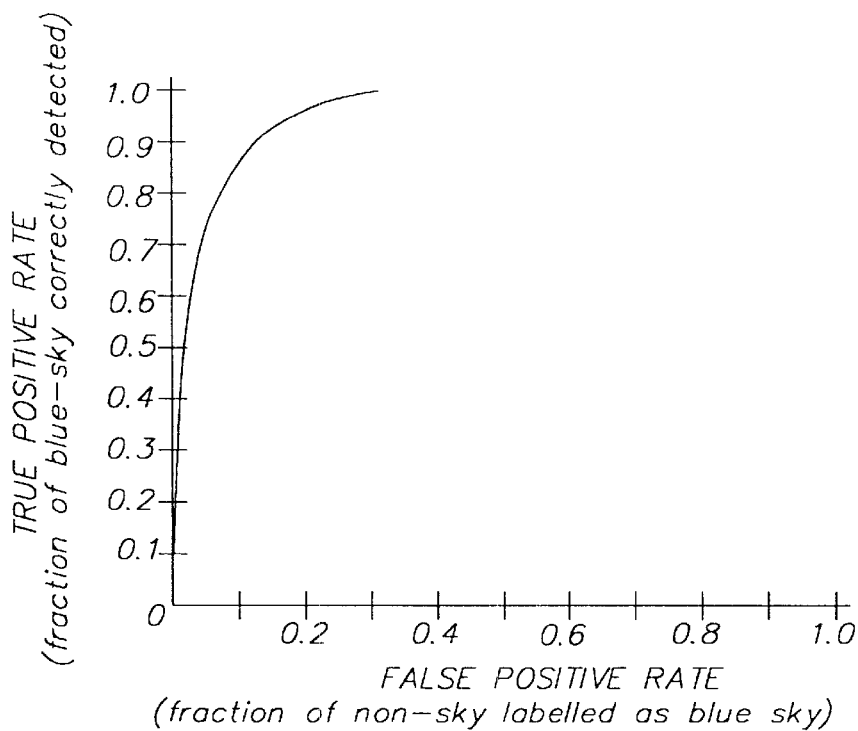
FIG. 5 is a graphical illustration of the receiver operating characteristic (ROC) of sky color classification.

A pixel-level receiver operating characteristic (ROC) of the inventive color classifier is shown in FIG. 5. This curve shows the true positive and false positive performance if the processing in the color classifier was immediately followed by a hard threshold at a variety of levels.

Conventionally, the global threshold is not dynamic and is found by locating the position on the curve closest to the upper left-hand corner of the graph shown in FIG. 5. For example, using a threshold of 0.0125 gives correct detection of 90.4% of bluesky pixels, but also detects (incorrectly) 13% of non-blue-sky pixels. Among those detected non-blue-sky pixels, water accounts for a significant portion. To the contrary, the invention does not employ a predefined "hard" threshold, but instead performs a region-extraction process before validating each region against a set of sky signatures. This process is discussed in detail below with respect to FIG. 7.

Figure 7:
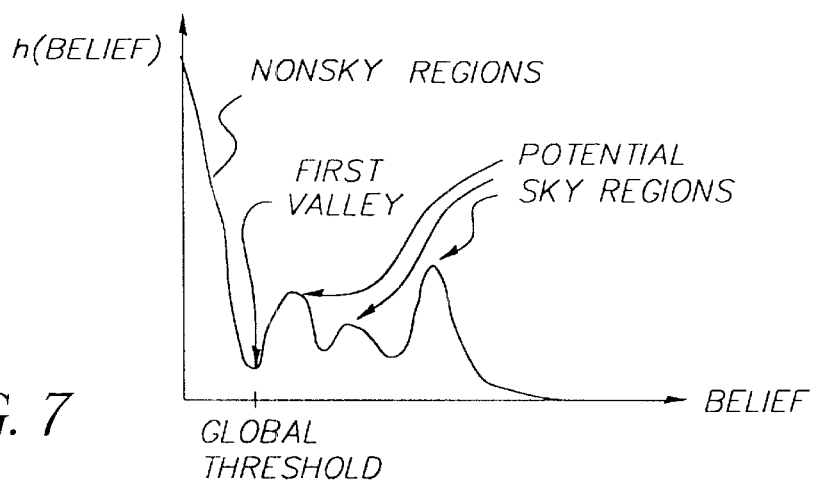
FIG. 7 is a graphical illustration of the threshold determination for sky color beliefs according to the invention.

More specifically, the inventive region extraction process (e.g., item 202 discussed above) automatically determines an appropriate threshold for the sky color belief map by finding the first valley point encountered moving from lower beliefs to higher beliefs in the belief histogram, and then performs a connected component analysis, as shown in FIG. 7. In addition, with the invention, the connected components are refined to produce a region-level representation of the sky segments, which facilitates sky signature validation that is otherwise impossible at the pixel level.

Figure 6:
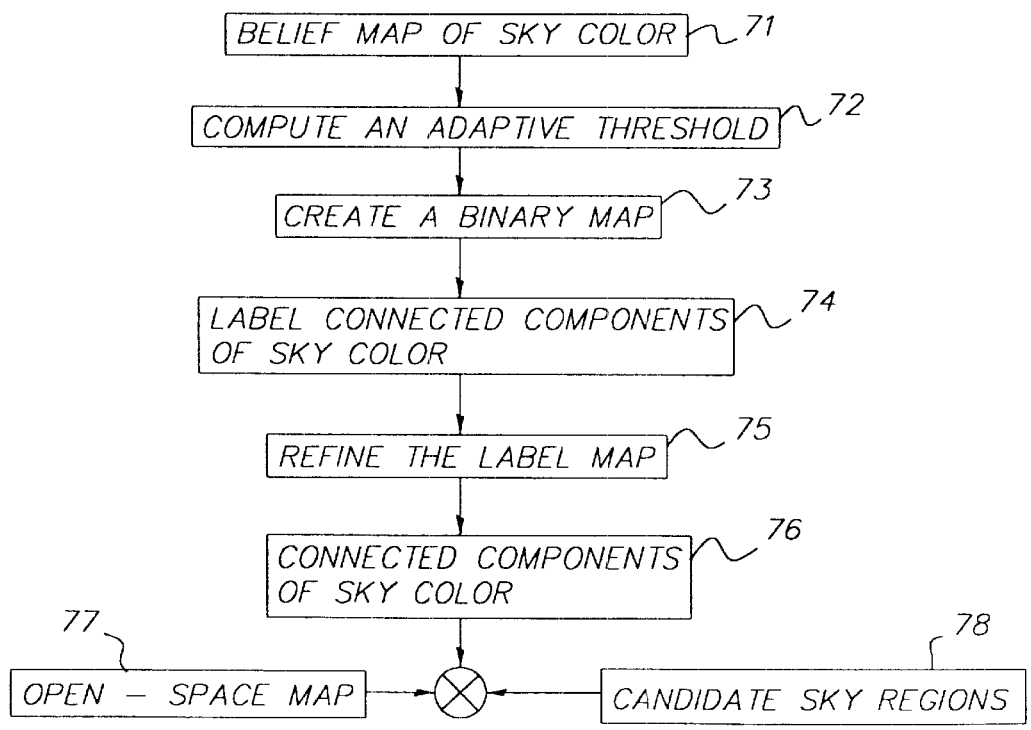
FIG. 6 is a schematic architectural diagram of the region extraction portion of the invention.

In FIG. 6, more detail is given for the region extraction process 202 (in FIG. 2). For a belief map 71, where the value of each pixel is proportional to the belief of that pixel having a sky color, a global threshold 72 is determined in an adaptive fashion, as discussed below with respect to FIG. 7. A binary map 73 is created using this threshold, whereas a "1" pixel is considered as a candidate sky pixel and a "0" pixel is considered as a non-sky pixel. Connected components, which are regions of spatially contiguous "1" pixels, are uniquely labeled 74 to produce spatially separated nonzero regions of sky color. Note that non-sky pixels are labeled to "0" (referred to herein as "unlabeled") regardless of their connectivity. Each connected component of sky color is refined 75 using two operations, which are discussed in greater detail below, to produce the connected components of sky color 76. An open space map 77 (which is also discussed below) is combined with the connected components to produce the candidate sky regions that are output by item 202 in FIG. 2.

FIG. 7 illustrates the inventive process for dynamically determining the global threshold. First, a histogram of the belief values is obtained form the belief map of sky color. Next, the histogram is smoothed to remove noise (e.g., producing the cart shown in FIG. 7). The first significant valley (e.g., "First valley" in FIG. 7) is found in the smoothed histogram. In a simple image where there is a distinctive sky region and everything else is distinctively non-sky, the histogram has only two peaks and one valley in between. In complex images there are sky, water and other blue regions. Therefore, the invention utilizes a different histogram for each image, which permits a dynamic threshold to be created for each individual image processed by the invention.

In Saber, supra, the last valley in the smoothed histogram was used to adjust a universal threshold in a maximum likelihood estimation (MLE) scheme based on the assumption that the true sky region in an image always has the highest probability. However, in some cases, a blue-colored non-sky region may have higher sky belief in terms of color. Therefore, the invention retains all sky-colored regions for further analysis and rules out non-sky regions that happen to have sky colors in the alter stages of the sky detection process. Therefore, the belief value at which the first valley is located is chosen as the global threshold. As mentioned above, this threshold is determined adaptively for each individual image to accommodate different shades of sky as well as the image capturing conditions.

The first of the two refinement operations, discussed in item 75 above, is region splitting. Region splitting is used to split spatially connected bluish (potential sky) regions that belong to different objects but otherwise have similar belief values in terms of having sky color. For example, such a region could be blue cloth against blue sky. Such regions may have similar beliefs (in being typical colors of sky) and thus are not separable in the belief map.

However, such regions have different shades of blue colors and thus are separable using a general-purpose color segmentation processes, such as an adaptive k-means processing (e.g., see J. Luo, R. T. Gray, and H.-C. Le "Towards a Physics-Based Segmentation of Photographic Color Images," in *Proc. IEEE Int. Conf. Image* Process., 1997, incorporated herein by reference). The invention utilizes this process and splits a labeled region of sky color into two or more regions (with unique new labels) if the region is a conglomerate of multiple regions indicated by the color segmentation process.

In another embodiment of the invention, an open-space detection process 77 (described in J. Warnick, R. Mehrotra and R. Senn, U.S. Pat. No. 5,901,245, "Method and system for detection and characterization of open space in digital images," incorporated herein by reference) can be used instead of a general-purpose color segmentation process. Open space is defined a smooth and contiguous region in an image. It is very useful for placing a desired caption or figurative element in an image.

The automatic open-space detection process mentioned above (Warnick, supra) is based on two separate stages of operation. First, after a proper color space transformation is performed, a gradient-based activity map is computed and a proper threshold is determined according to a multi-region histogram analysis. In the second stage, a connected component analysis is performed on the binary activity map to fill voids and small regions are discarded. The open-space process as implemented in Warnick, supra, is both effective and efficient. Its speed is only a fraction of that required for the color segmentation process. In addition, open-space detection provides additional confirmation of the smoothness of the candidate regions. Therefore, in this preferred embodiment, the invention utilizes the open-space detection process. Thus, open space detection is incorporated to (1) rule out highly textured regions and (2) separate sky from other blue-colored regions such as bodies of water.

The second refinement operation performed in item 75 of FIG. 6 comprises region growing. The inventive region growing process is used to fill in holes and extend boundaries. This is especially useful where "marginal" pixels may have sky-color belief values that barely fail the global threshold but are close enough to the belief values of the neighboring pixels that have passed the initial global threshold.

With the invention a "growing threshold" is used to rebel such marginal pixels to a connected component if the difference in belief values between an "unlabeled" pixel and its neighboring "labeled" pixel is smaller than a second threshold for region growing. More specifically, seed regions are created by taking the intersection between pixels with supra-threshold belief values and the connected components in the open-space map. For pixels with sub-threshold belief values, region growing is guided by the continuity in belief values as well as continuity in color values. Small, isolated sky regions are ignored.

In the sky signature measures, which are discussed above in item 207 in FIG. 2, one-dimensional traces are extracted within the region along the horizon-to-zenith direction. The invention automatically determines the sky orientation based on the distribution of both vertical-horizontal gradients in each extracted region.

More specifically, the invention uses the red signal to determine the sky orientation, because of the physics-motivated model of sky. As discussed above, with the physics-motivated model of sky, the amount of light scattering depends on the wavelength of the light and the scattering angle. In general, the desaturation effect towards the horizon is caused by the increase in red light and green light relative to blue light. Furthermore, the present inventors have determined that blue light stays relatively unchanged along the horizon-zenith direction. The change in the green signal may not be as pronounced as in the red signal. Therefore, the red signal provides the most reliable indication of the desaturation effect. Consequently, the uneven gradient distribution is most observable in the red signal.

Figure 8A:
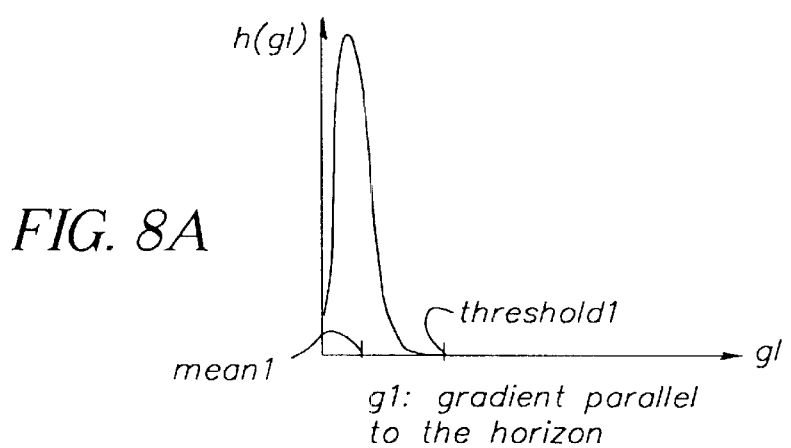
FIGS. 8A–8B are graphical illustrations of typical distributions of gradient magnitudes in a sky region.
Figure 8B:
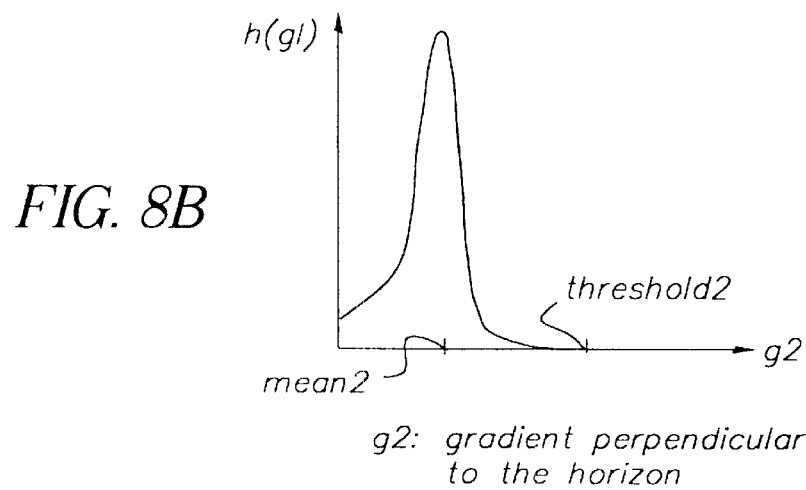

Because of the desaturation effect, sky has low gradient in the horizon-zenith direction, but is essentially constant in the perpendicular direction. When the position of the sun is high above the horizon, the concentric distribution of the scattering light can be approximated by horizontal strips of different color regions (e.g., see FIG. 3, barring lens falloff effect). Therefore, the distribution of gradient has different characteristics in horizontal and vertical directions, as shown by FIGS. 8A and 8B (which are parallel and perpendicular to the horizon, respectively), where mean 1<<mean2.

After regions extraction 202 and orientation determination 205, the sky signature validation process extracts one-dimensional traces within the region along the determined horizon-to-zenith direction 206, determines by a set of rules whether the trace resembles a trace from the sky 207, and finally computes the sky belief of the region by the percentage of traces that fit the physics-based sky trace model 208, as discussed above.

Figure 10A:
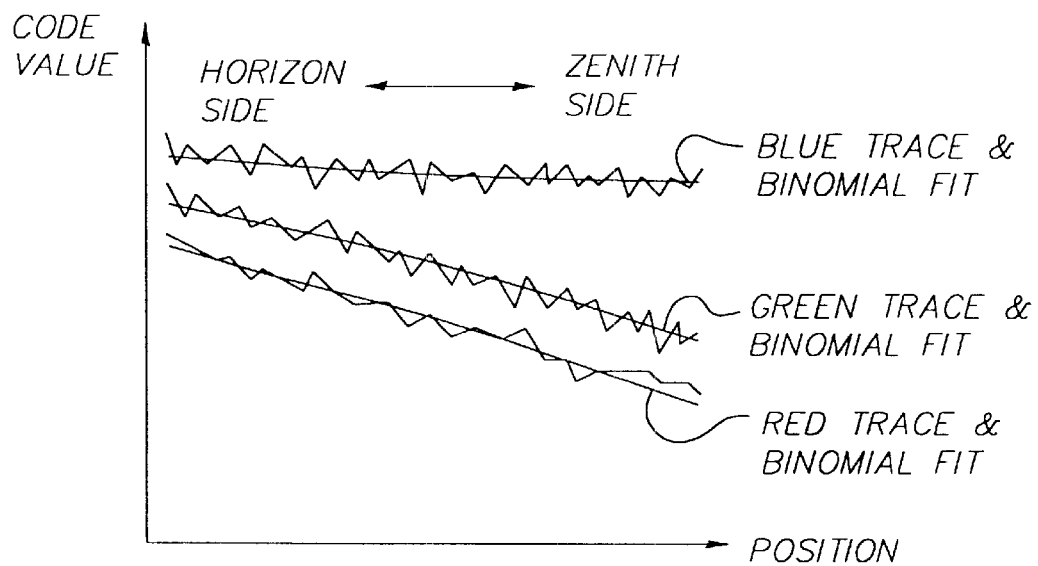
FIG. 10A is a graph showing a typical trace of clear sky.
Figure 10B:
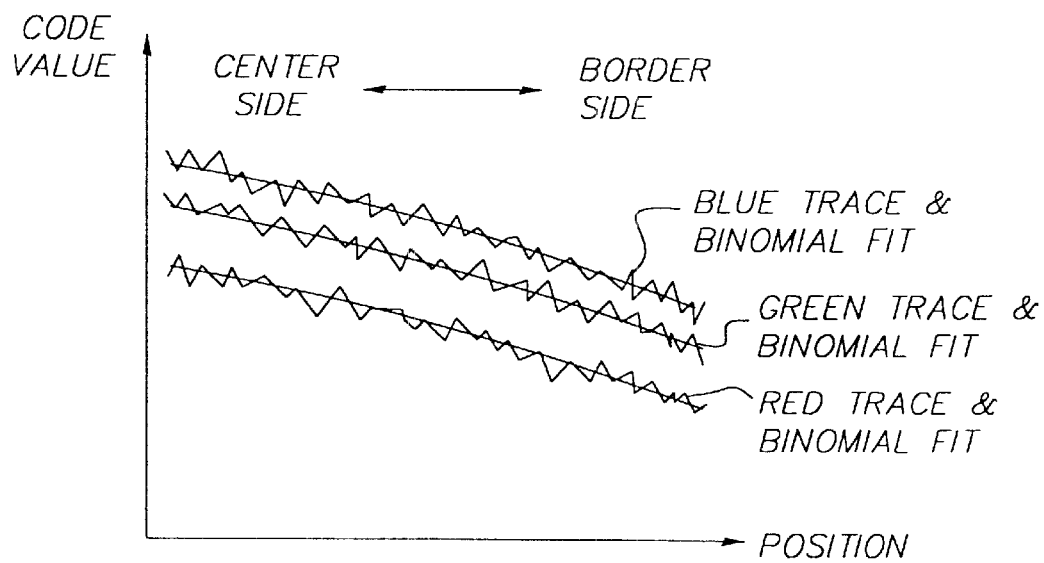
FIG. 10B is a graph showing a typical trace of a blue wall.

Based on the analysis of numerous one-dimensional traces from sky as well as a few other typical sky-colored subject matters in images, the invention includes models to quantify these traces. In particular, traces extracted along the horizon-zenith direction reveal a signature of sky traces shown in FIG. 10A. The blue signal of a key trace tends to be constant across the sky; the green signal and red signal gradually decrease away from the horizon; the red signal decreases faster than the green signal. More specifically, all the three signals can be approximated by lower-order polynomials (e.g., quadratic polynomials). The micro-variations in the three signals are not correlated. In comparison, a few other blue-colored subject matters do not exhibit such a signature. To the contrary, in FIG. 10B, there is shown a typical trace of a blue wall in a flash-fired picture, where the three signals change smoothly in parallel.

Figure 11A:
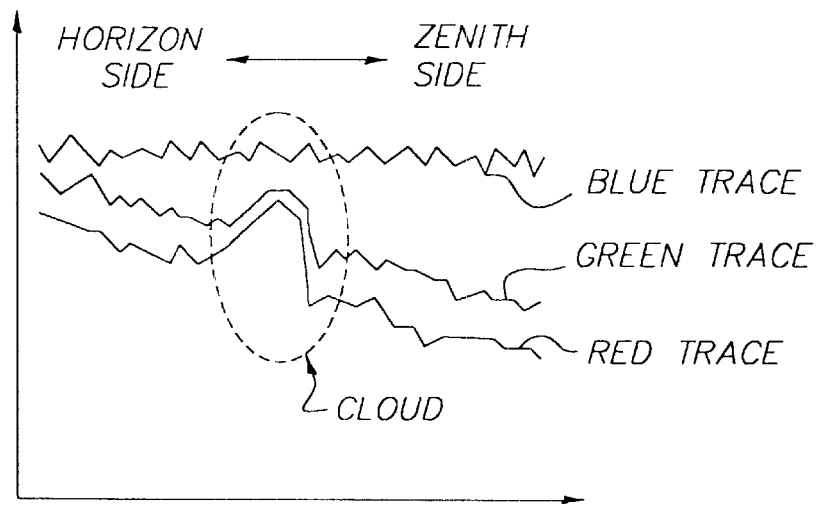
FIG. 11A is a graph showing a typical trace of mixed sky and clouds.
Figure 11B:
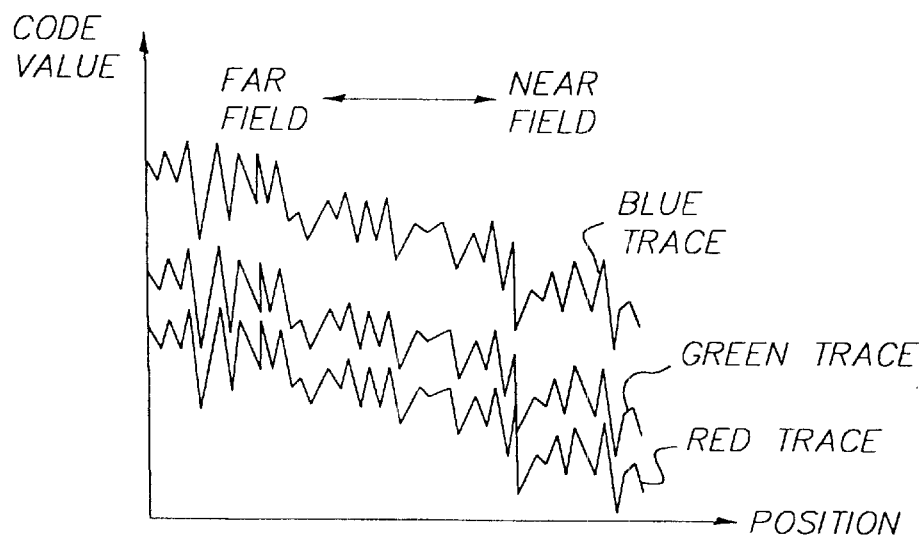
FIG. 11B is a graph showing a typical trace of water.

Similarly, FIG. 11B shows a typical trace through a body of water, where the three signals are highly correlated in local variations. Both of these two cases indicate that the changes are mostly in luminance. Furthermore, as illustrated in FIG. 11A, in mixed sky where (white) clouds are present together with clear blue sky, the red and green signals jump high in the clouds while the blue signal stays the same to create a neutral cloud region. Typically, the red signal jumps up by a larger amount than the green signal in the clouds.

Figure 9:
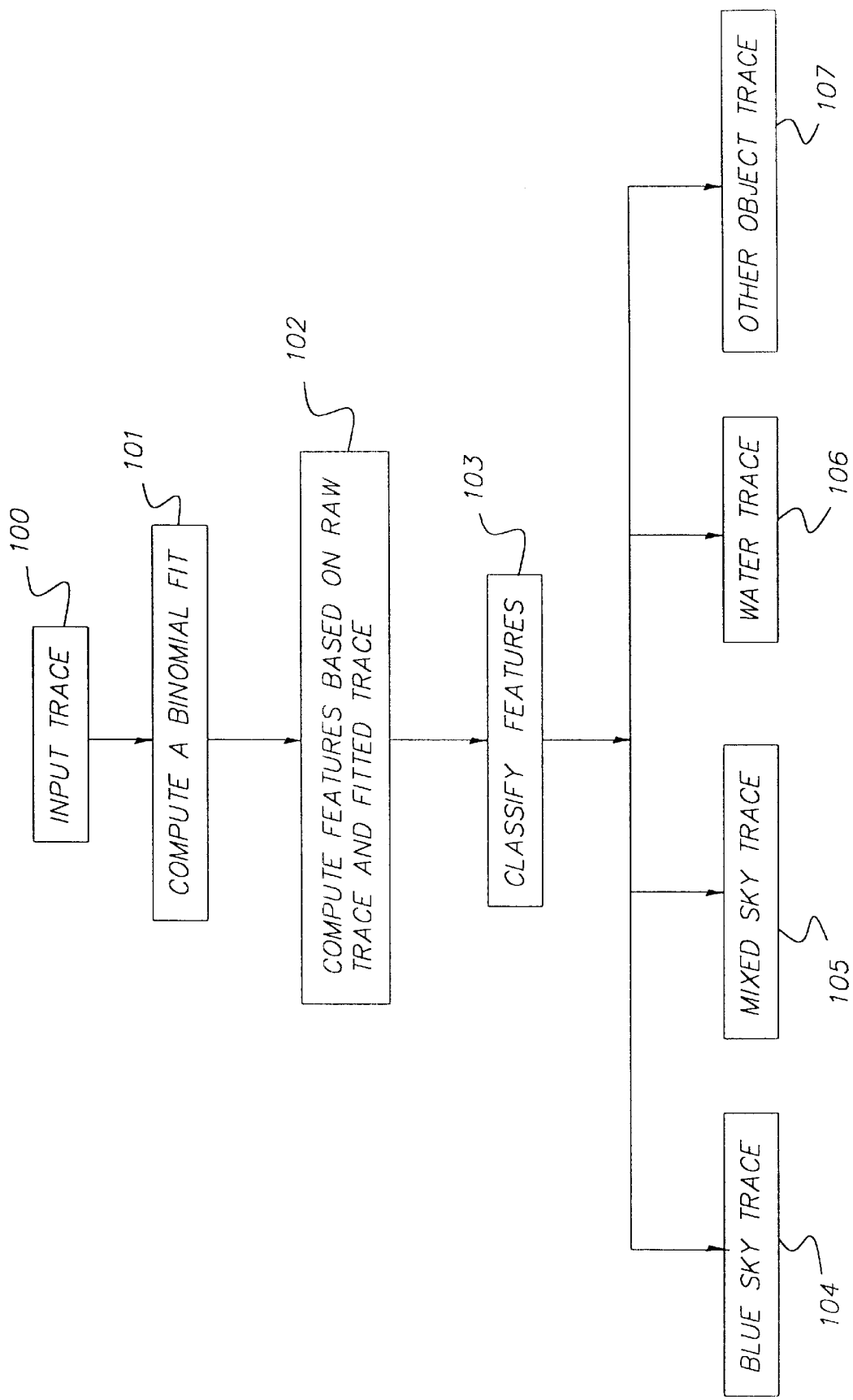
FIG. 9 is a schematic architectural diagram of the trace analysis performed by the invention.

FIG. 9 is a flowchart illustrating the processing of the input trace. More specifically, in item 100, an extracted trace is analyzed with respect to the trace models shown in FIGS. 10A–11B. First a quadratic polynomial fit 102 is computed for the three signals: red, green and blue, respectively. The quadratic polynomial is given as $y=f(x)=c1+c2*x+c3*x^2$ where x denotes the index of the one-dimensional trace and y is the code value of the corresponding signal.

Next, a plurality of features ("signatures") are computed based on either the raw trace or the fitted trace 102. Features are classified 103 so that a trace can be characterized as a blue sky trace 104, or a non-blue-sky trace (a mixed sky trace 105, a water trace 106, or "unknown" 107). In the example shown below, ten measure ("signatures") are computed for each extracted sky trace. However, one ordinarily skilled in the art could prepare any number of such signatures in light of this disclosure.

The first signature regards the offset of the fitting quadratic polynomial. The offsets are related to the mean values in red, green, and blue channels. This signature feature requires the average blue component to be above the average red and green components. Due to the specific way a trace is extracted, this features actually translates into the requirement that the blue component is the strongest at the most blue side of the trace. C-language-like pseudo code for such a logical statement follows:

If $(cb[1]>cr[1]+BR\_OFFSET\&\&cb[1]>cg[1]-BF\_OFFSET\&\&cg[1]>cr[1]-RG\_OFFSET)$ sig1=1 where

| # define BR_OFFSET | 10 |
| # define BG_OFFSET | 5 |
| # define RG_OFFSET | 5 |

Instead of using the above crisp rule, it may be advantageous to use a trapezoidal fuzzy scoring function of continuous values with a cutoff point with a certain HUGEPENALTY if this condition is violated.

The second exemplary signature regards the slope of the fitting quadratic polynomial. In general, due to the specific way a trace is extracted, the slopes of RGB signals are negative. This feature requires that the blue signal decreases (if so) slower than the red and green signals. On the other hand, monotonic increase (positive slope) is also allowed by this feature. C-language-like pseudo code for such a logical statement follows.

if $(cb[2]>cg[2]\&\&cb[2]>cr[2])$ sig2=1;

if $(!sig2\&\&sig2bg\&\&sig2br)$ sig2=1;

This is implemented as a crisp rule. Exception is granted to relax the strict condition of sig2 to two more loosely defined conditions sig2bg and sig2br when sig2 is not satisfied.

The third signature regards the similarity or parallelism among the fitted signals. Pseudo code for such a logical statement follows.

if $((rgdist<brdist\&\&bgdist<brdist)||(rgdist<bgdist\&\&rgdist<brdist))$ sig3=1;

Note that rgdist is used to indicate the difference ("distance") between two fitted red and green signals. It is determined in the following way. First, one of the two signals is shifted appropriately such that the shifted signal has the same value at the starting point as the unshifted signal. Let the fitted red and green signals be $$r(x)=c'_1+c'_2+c'_3x^2 \quad g(x)=c_1^g+c_2^g x+c_3^g x^2 \qquad (7)$$

then $$\hat{r}(x)=r(x)+(c_1^g-c_1')=c_1^g+c'_2x+c'_2x+c'_2x+c'_3x^2 \qquad (8)$$

such that $\hat{r}(0)=g(0)$.

Next, the difference or distance between the fitted red and green signals is given by $$rg\text{dist}=|\hat{r}(L/2)-g(L/2)| \qquad (9)$$

where L is the total length of the trace. In other words, this feature measures the difference between two fitted signals by the distance at two midpoints when one of them is shifted so that both signals have the same starting value. The other two terms, bgdist and brdist, are defined in a similar fashion. One possibility here is not to use the absolute values such that sign information is used in conjunction with the absolute difference.

The fourth signature regards red-green similarity. The red and green signals should be reasonably similar. Pseudo code for such a logical statement follows if (rgdist<MAXRGDIST) sig4=1;

where define MAXRGDIST 15

The fifth signature regards low nonlinearity. All the three signals should have low nonlinearity. Pseudo code for such a logical statements follows.

If (fabs (cb[3])<MAXNONLINEARITY&&fabs
        (cg[3])<MAXNONLINEARITY&&fabs (cr[3])<MAXNON-
        LINEARITY) sig5=1;

where define MAXNONLINEARITY 0.05

Instead of using the above crisp rule, it may be advantageous to use a sigmoid fuzzy scoring function of continuous values with a cutoff point with a certain HUGEPENALTY if this condition is violated. The sixth signature regards red-green-blue correlation for large modulation. Pseudo code for such a logical statement follows.

if (largesignal&&corr_rg>0.5&&corr_br<0.3&&corr_bg<0.3)
        sig6=1; //red-grn-blue correlation for large modulation else if (!largesignal&&corr_rg>0.2&&corr_br<0.4&&corr_
        bg<0.4) sig6=-1; //red-grn-blue correlation for small modulation else if (largesignal==-1) sig6=1; //red-grn-blue correlation for
        micro modulation if (largesignal!=-1&&corr_rg>0.9&&corr_rg>5*corr_
        br&&corr_rg>5*corr_bg) sig6=-1; //significantly higher red-
        grn correlation where corr-xy denotes the correlation coefficient between signal x and y. Again, instead of using the above crisp rule, it may be advantageous to use a sigmoid fuzzy scoring function of continuous values with a cutoff point with a certain HUGEPENALTY if this condition is violated (s>0.95). The seventh signature regards red-green-blue similarity or near parallelism. Pseudo code for such a logical statement follows.

if (rgdist<MINDIST&&bgdist<MINDIST&&brdist<MINDIST)
        sig7=0;

where define MINDIST 1.5

As before, instead of using the above crisp rule, it may be advantageous to use a sigmoid fuzzy scoring function of continuous values with a cutoff point with a certain HUGEPENALTY if this condition is violated (s>0.95).

The eighth signature regards negative red/green slope. Pseudo code for such a logical statement follows.

if (cr[2]>0ANDcg[2]>0) sig8=0;

This is implemented as a crisp rule.

The ninth signature regards goodness of the fit. Pseudo code for such a logical statement follows.

if (rchisq>MAXCHISQ_R&&gchisq>MAXCHISQ_
        G&&bchisq>MAXCHISQ_B) sig9=0;

where define MAXCHISQ_R 50
    #define MAXCHISQ_G 25
    #define MAXCHISQ_B 100 where CHISQ denotes a $\chi$-square fitting error.

Also, instead of using the above crisp rule, it may be advantageous to use a sigmoid fuzzy scoring function of continuous values with a cutoff point where a certain HUGEPENALTY if this condition is violated (s<0.1).

Signature ten regards the decrease in red and green signals. Pseudo code for such a logical statement follows.

sigA=rdec*gdec;

where rdec indicates whether the red signal decreases (monotonically). In particular, rdec is determined using the fitted red signal by taking two samples first x1 at $\frac{1}{4}^{th}$ point and second x2 at $\frac{3}{4}^{th}$ point of the total length, respectively Pseudo code for such a logical statement follows.

if (x2<x1) rdec=1;

else rdec=0 the other term gdec is determined in a similar fashion for the green signal. This is implemented as a crisp rule. Note that sigA=1 if and only if rdec=1 and gdec=1.

These ten features are integrated in the current rule-based process as a crisp decision; a given trace is only declared a sky trace when all the condition are satisfied, i.e., if (sig1&&sig2&&sig3&&sig4&&sig5&&sig6!=
        0&&sig7&&sig8&&sig9&&sigA) skysignature=1;

Or, in a fuzzy logic-based algorithm, if (sig1>EFFECTIVEZERO&&sig2>EFFECTIVEZERO&&
        sig3>EFFECTIVEZERO&&sig4>EFFECTIVEZERO&&
        sig5>EFFECTIVEZERO&&fabs(sig6)>EFFECTIVEZERO)
        &&sig7>EFFECTIVEZERO&&sig8>EFFECTIVEZERO&&
        sig9>EFFECTIVEZERO&&sigA>EFFECTIVEZERO) skysig-
        nature=(sig1+sig2+ . . . +sig9+sigA)/10 where define EFFECTIVEZERO 0.1

Upon examination of all candidate traces, which are mostly (e.g., 95%) of sky-colored pixels, the sky belief of the region is computed as the percentage of traces that satisfy the physics-based sky trace model. A sky-colored region is declared as non-sky if the sky belief is below a threshold (empirically determined at 0.25 in this example for general purposes).

FIGS. 12A–13H illustrate the invention's performance on various images. More specifically, FIGS. 12A–B and 13A–B illustrate original images to be processed. FIGS. 12C–D and 13C–D represent the results of the color classification process of the invention shown in item 201 in FIG. 2, discussed above. FIGS. 12E–F and 13E–F illustrate the result of the open space map (item 77 in FIG. 6) produced by the invention. FIGS. 12G–H and 13G–H illustrate the invention's determination of the sky regions as white portions and non-sky regions as black portions. The brightness level in FIGS. 12C–D and 13C–D is proportional to the sky color beliefs, however the brightness level in 12E–F and 13E–F merely indicates separated label regions.

Figure 12A:
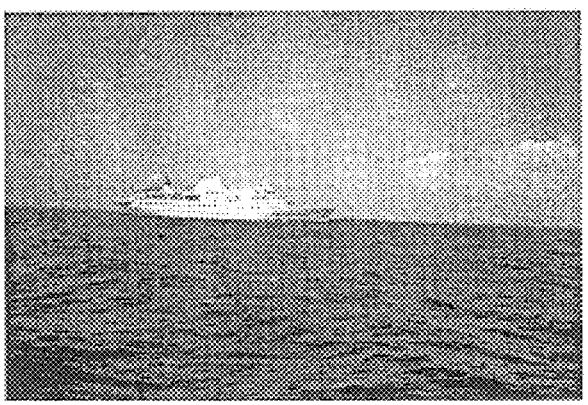
FIGS. 12A–12H illustrate different stages of images processed by the invention.
Figure 12C:
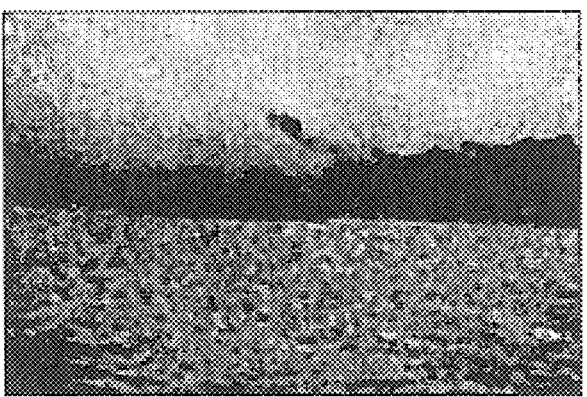
Figure 12E:
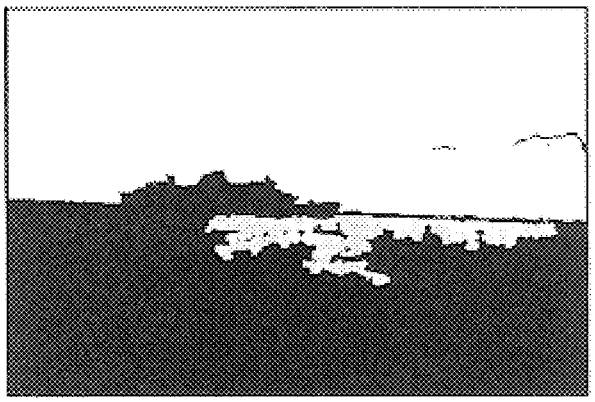
Figure 12G:
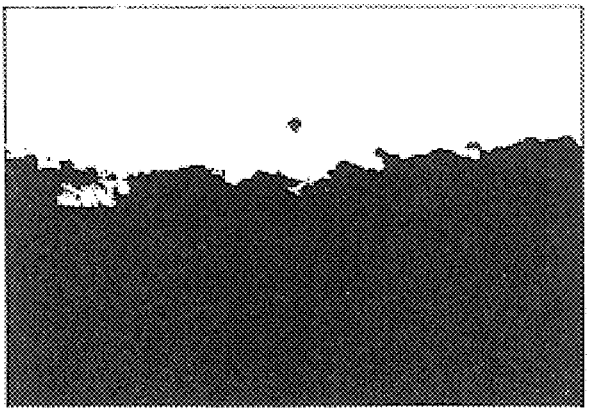
Figure 12B:
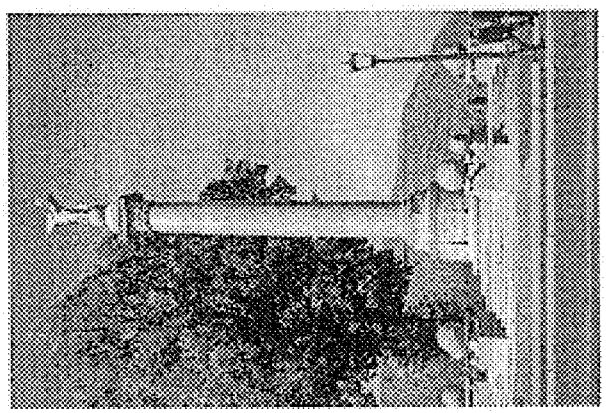
Figure 12D:
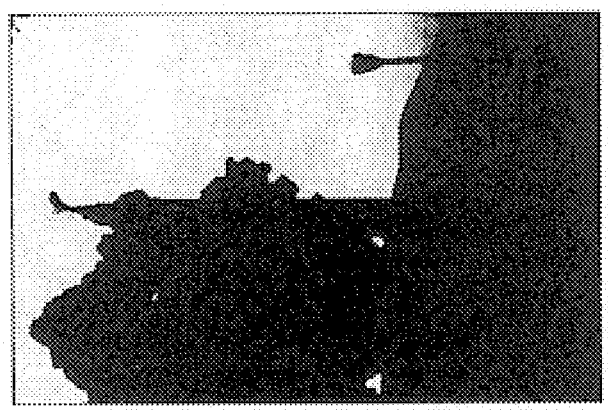
Figure 12F:
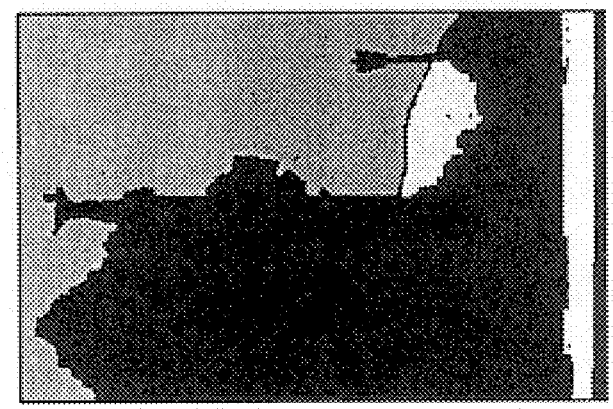
Figure 12H:
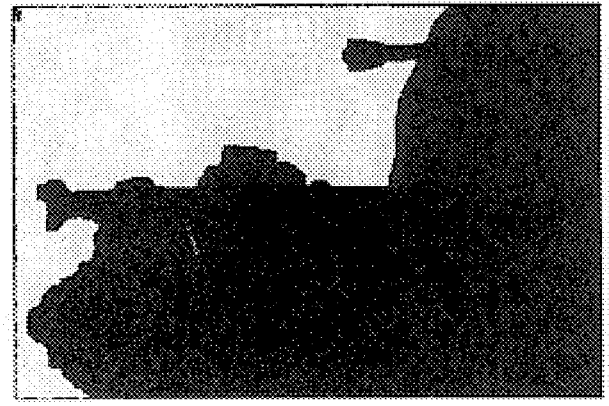
Figure 13A:
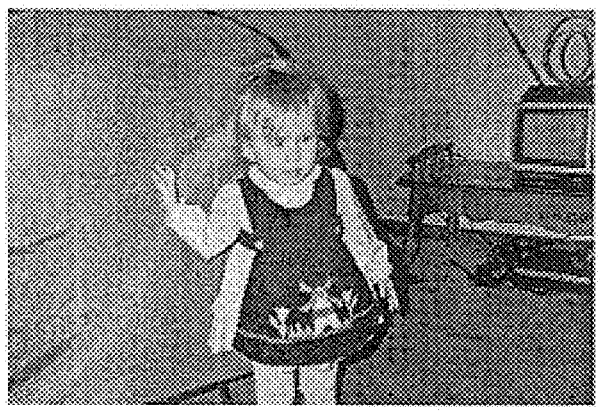
FIGS. 13A–13H illustrate different stages of images processed by the invention.
Figure 13C:
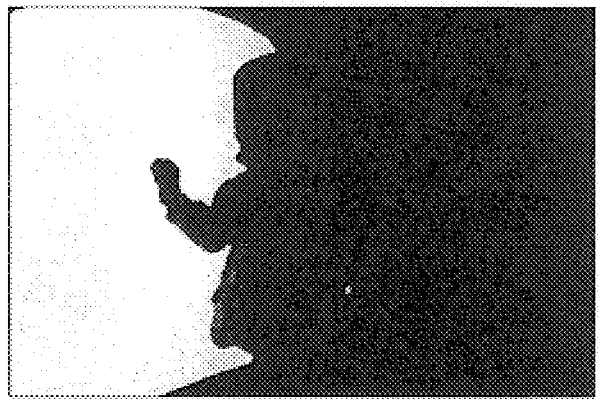
Figure 13E:
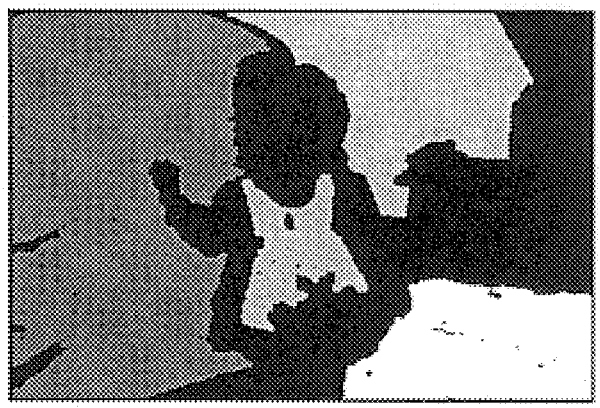
Figure 13G:
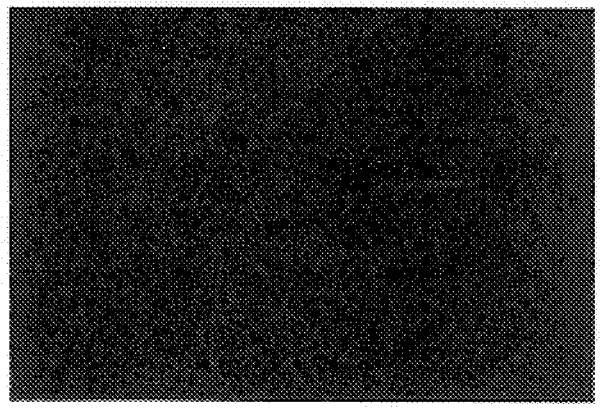
Figure 13B:
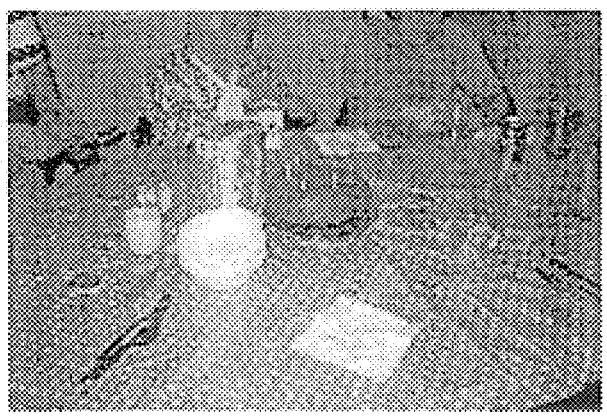
Figure 13D:
Figure 13F:
Figure 13H:
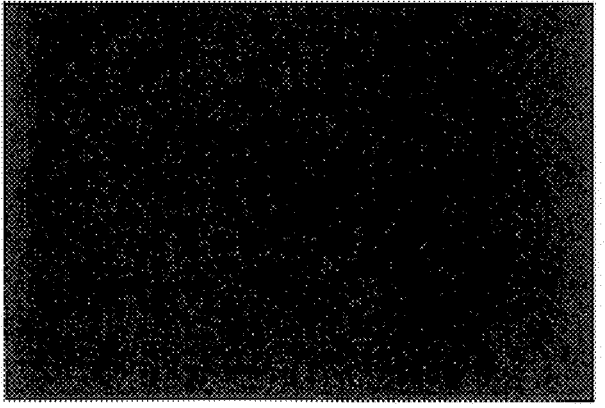

The invention works well on RGB images produced by such sources as film and digital cameras. The detected sky regions show excellent alignment to perceptual boundaries. The few examples shown in FIGS. 12A–12H demonstrate the performance of the invention. The sky and the sea are correctly separated and the true sky region is detected in FIG. 12G. The image in FIG. 12B is an example where the assumption of sky at the top is invalid but the sky is nevertheless correctly detected by the proposed process based on correct determination of the sky orientation. A smooth blue object in FIG. 13A and a textured table cloth in FIG. 13B are correctly rejected, respectively, by the invention.

Given the effectiveness of the inventive sky signature validation process, it is possible to relax the color classification stage to include other off-blue shades of the sky, such as the shades at sunset or sunrise. In contrast to overcast sky, cloudless sky at sunset or sunrise exhibits similar scattering effect as the counterpart during the day. The main difference is the warm color tint from the rising or setting sun.

A 2D planar fit of a candidate region is an alternative way of conducting sky validation. For regions that have holes, the weighting factor at hole locations can be set to zero so that only the sky-colored pixels contribute to the planar fit. It may be necessary to require that the holes can only be due to bright neutral objects (clouds) to limit the potential increase of false positive detection.

Therefore, the invention comprises a system for sky detection that is based on color classification, region extraction, and physics-motivated sky signature validation. The invention works very well on 8-bit images from sources including film and digital cameras after pre-balancing and proper dynamic range adjustment. The detected sky regions also show excellent spatial alignment with perceived sky boundaries.

As mentioned above, the invention utilizes a physical model of the sky based on the scattering of light by small particles in the air. By using a physical model (as opposed to a color or texture model), the invention is not likely to be fooled by other similarly colored subject matters such as bodies of water, walls, toys, and clothing. Further, the inventive region extraction process automatically determines an appropriate threshold for the sky color belief map. By utilizing the physical model in combination with color and texture filters, the invention produces results that are superior to conventional systems.

While the invention has been described in terms of preferred embodiments, those skilled in the art will recognize that the invention can be practiced with modification within the spirit and scope of the appended claims.

What is claimed is:

1. A method of detecting sky regions in an image comprising:
   classifying potential sky pixels in said image by color;
   extracting connected components of said potential sky pixels;
   eliminating ones of said connected components that have a texture above a predetermined texture threshold;
   computing desaturation gradients of said connected components; and
   comparing said desaturation gradients of said connected components with a predetermined desaturation gradient for sky to identify true sky regions in said image.

2. The method in claim 1, wherein said desaturation gradients comprise desaturation gradients for red, green and blue trace components of said image.

3. The method in claim 1, wherein said predetermined desaturation gradient for sky comprises, from horizon to zenith, a decrease in red and green light trace components and a substantially constant blue light trace component.

4. The method in claim 1, wherein said classifying comprises;
   forming a belief map of pixels in said image using a pixel classifier;
   computing an adaptive threshold of sky color; and
   classifying ones of said pixels that exceed said threshold as said potential sky pixels.

5. The method in claim 4, wherein said computing of said adaptive threshold comprises identifying a first valley in a belief histogram derived from said belief map.

6. The method in claim 5, wherein said belief map and said belief histogram are unique to said image.

7. The method in claim 1, further comprising determining a horizontal direction of a scene within said image by:
   identifying a first gradient parallel to a width direction of said image;
   identifying a second gradient perpendicular to said width direction of said image; and
   comparing said first gradient and said second gradient, said horizontal direction of said scene being identified by the smaller of said first gradient and said second gradient.

8. A method of detecting sky regions in an image comprising: computing desaturation gradients of regions in said image; and
   comparing said desaturation gradients of said regions with a predetermined desaturation gradient for sky to identify true sky regions in said image.

9. The method in claim 8, further comprising classifying potential sky regions in said image by color.

10. The method in claim 8, further comprising eliminating ones of said regions that have a texture above a predetermined texture threshold.

11. The method in claim 8, wherein said desaturation gradients comprise desaturation gradients for red, green and blue trace components of said image.

12. The method in claim 8, wherein said predetermined desaturation gradient for sky comprises, from horizon to zenith, a decrease in red and green light trace components and a substantially constant blue light trace component.

13. The method in claim 9, wherein said classifying comprises:
   forming a belief map of pixels in said image using a pixel classifier;
   computing an adaptive threshold of sky color; and
   classifying ones of said pixels that exceed said threshold as said potential sky pixels.

14. The method in claim 13, wherein said computing of said adaptive threshold comprises identifying a first valley in a belief histogram derived from said belief map.

15. The method in claim 14, wherein said belief map and said belief histogram are unique to said image.

16. The method in claim 8, further comprising determining a horizontal direction of a scene within said image by:
- identifying a first gradient parallel to a width direction of said image;
- identifying a second gradient perpendicular to said width direction of said image; and
- comparing said first gradient and said second gradient, said horizontal direction of said scene being identified by the smaller of said first gradient and said second gradient.

17. An image identification system comprising:
- a color classifier classifying potential sky pixels in said image by color;
- an extractor identifying connected components of said potential sky pixels;
- a first comparator eliminating ones of said connected components that have a texture above a predetermined texture threshold;
- a logic unit computing desaturation gradients of said connected components; and
- a second comparator comparing said desaturation gradients of said connected components with a predetermined desaturation gradient for sky to identify true sky regions in said image.

18. The image identification system in claim 17, wherein said desaturation gradients comprise desaturation gradients for red, green and blue trace components of said image.

19. The image identification system in claim 17, wherein said predetermined desaturation gradient for sky comprises, from horizon to zenith, a decrease in red and green light trace components and a substantial constant blue light trace component.

20. The image identification system in claim 17, wherein said color classifier includes:
- a pixel classifier forming a belief map of pixels in said image;
- a second logic unit computing an adaptive threshold of sky color; and
- a third comparator classifying ones of said pixels that exceed said threshold as said potential sky pixels.

21. The image identification system in claim 20, wherein said second logic unit identifies a first valley on a belief histogram derived from said belief map to computer said adaptive threshold.

22. The image identification system in claim 21, wherein said belief map and said belief histogram are unique to said image.

23. The image identification system in claim 17, further comprising:
- a horizontal identification unit that identifies a first gradient parallel to a width direction of said image and a second gradient perpendicular to said width direction of said image,
- a third comparator comparing said first gradient and said second gradient, said horizontal direction of said comparator identifying said scene by identifying the smaller of said first gradient and said second gradient.

24. A method of using and a computer program running on a computer system to detect sky regions in an image, said method comprising:
- using said computer program to classify potential sky pixels in said image by color;
- using said computer program to extract connected components of said potential sky pixels;
- using said computer program to eliminate ones of said connect components that have a texture above a predetermined texture threshold;
- using said computer program to computer desaturation gradients of said connected components; and
- using said computer program to compare said desaturation gradients of said connected components with a predetermined desaturation gradient for sky to identify true sky regions in said image.

25. The method in claim 24, wherein said desaturation gradients comprise desaturation gradients for red, green and blue trace components of said image.

26. The method in claim 24, wherein said predetermined desaturation gradient for sky comprises, from horizon to zenith, a decease in red and green light trace components and a substantially constant blue light trace component.

27. The method in claim 24, wherein said using of said computer program to classify comprises:
- using said computer program to form a belief map of pixels in said image using a pixel classifier;
- using said computer program to compute an adaptive threshold of sky color; and
- using said computer program to classify ones of said pixels that exceed said threshold as said potential sky pixels.

28. The method in claim 27, wherein said using of said computer program to computer said adaptive threshold comprises using said computer program to identify a first valley in a belief histogram derived from said belief map.

29. The method in claim 28, wherein said belief map and said belief histogram are unique to said image.

30. The method in claim 24, further comprising using said computer program to determine a horizontal direction of a scene within said image by:
- using said computer program to identify a first gradient parallel to a width direction of said image;
- using said computer program to identify a second gradient perpendicular to said width direction of said image; and
- using said computer program to comparing said first gradient and said second gradient, said horizontal direction of said scene being identified by the smaller of said first gradient and said second gradient.

* * * * *